Nov. 22, 1949   J. G. OETZEL   2,488,552
MAGNETIC CLUTCH
Filed Oct. 8, 1945

INVENTOR
John George Oetzel
BY
Carlson, Pitzner, Hubbard & Wolfe
ATTORNEYS

Patented Nov. 22, 1949

2,488,552

UNITED STATES PATENT OFFICE 2,488,552

MAGNETIC CLUTCH

John George Oetzel, Beloit, Wis., assignor to Warner Electric Brake Manufacturing Company, South Beloit, Ill., a corporation of Illinois Application October 8, 1945, Serial No. 620,977

6 Claims. (Cl. 192—84)

This invention relates to electromagnetic friction clutches and more particularly to the type in which the magnetic coil is nonrotatable, the magnetic circuit being formed by rotatable and nonrotatable parts.

One object is to provide a clutch of the above character having a novel arrangement of the magnetic parts that avoids the necessity of a nonmagnetic gap of a width which varies with the wear of the clutch parts.

A more detailed object is to arrange the magnetic parts of the clutch so that the nonmagnetic gap between the rotating and nonrotating parts extends radially instead of axially.

Still another object is to provide a clutch of the above character in which coacting axially engageable clutch elements carry magnetic parts which remain in continuous rubbing contact so as to avoid the interposition of an axial air gap in the magnetic flux circuit.

Figure 1:
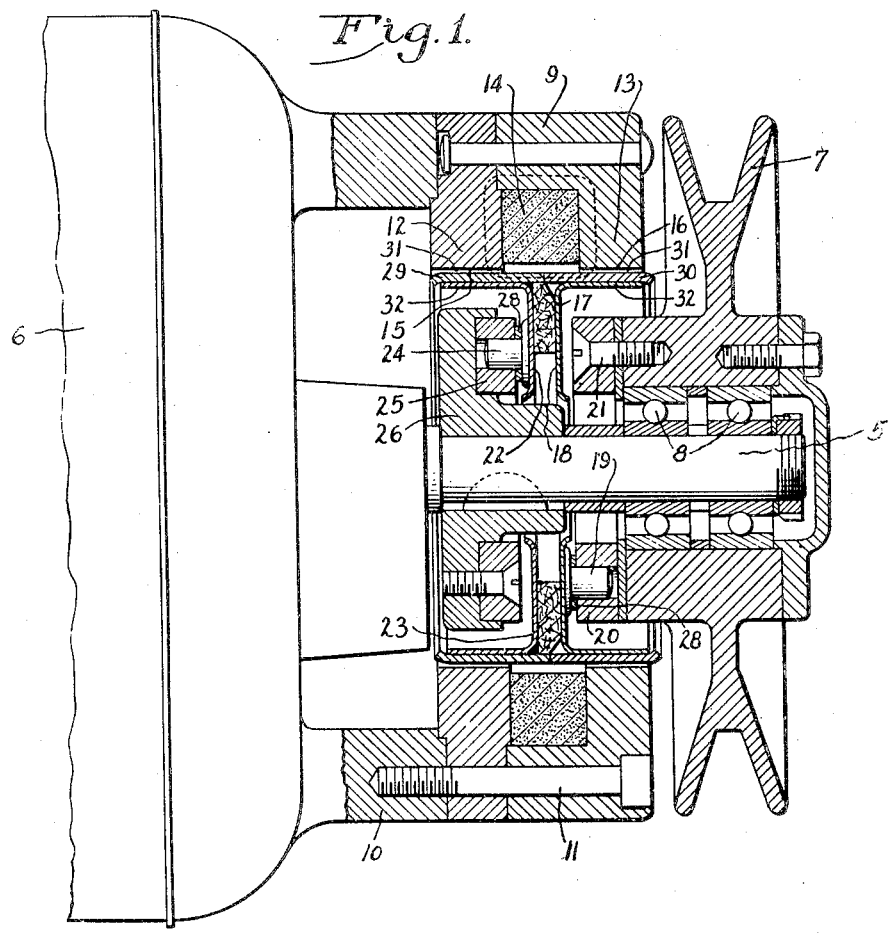

Other objects and advantages of the invention will become apparent from the following detailed description taken in connection with the accompanying drawings, in which Figure 1 is a diametrical cross section view of a magnetic clutch embodying the present invention.

Figure 2:
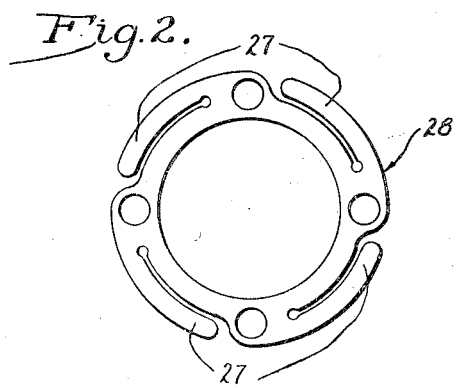

Fig. 2 is an end view of one of the spring parts.

In the drawings, the invention is embodied in a magnetic friction clutch for transmitting rotary power from the shaft 5 of an electric motor 6 to a pulley 7 rotatably supported on the outer end of the shaft through bearings 8. The magnet of the clutch is stationarily mounted and comprises a rigid two part ring 9 of magnetic material and U-shaped cross section rigidly clamped by screws 11 against a projecting flange 10 on the motor casing. This ring has two inwardly projecting pole pieces 12 and 13 axially spaced apart and receiving between them an annular coil 14 which is held in place in any suitable manner. The pole pieces terminate in cylindrical surfaces 15 and 16 which are of substantial axial length and concentric with the shaft 5 and the axis of the magnet.

The friction clutch proper is mounted within the magnet ring 9 and comprises axially engageable annular elements rotatable respectively with the shaft 5 and the pulley 7. The driven element is in the form of a flat disk 17 having a friction surface 18 on one side and annularly spaced pins 19 welded or otherwise secured to the other side and projecting slidably into holes in a nonmagnetic ring 20 which is secured by screws 21 against the inner end of the pulley hub. The driving element of the clutch is a similar disk 22 having a layer 23 of wear resistant friction material secured to its outer side and providing a flat surface engaging the surface 18 of the driven element. The disk 22 is supported through pins 24 which are slidable axially in a nonmagnetic ring 25 fastened to a collar 26 which is keyed to the motor shaft 5. The disks 17 and 22 are continuously urged toward each other to maintain their friction surface in light mechanical contact, this being accomplished in the present instance by the resilient arms 27 of flat rings 28 carried by the pins 19 and 24 and disposed between the disks and their supporting rings.

When the magnet coil 14 is energized, the clutch elements are drawn into firm gripping engagement by an axially directed attractive force produced within a magnetic structure which bridges the gap between the magnet pole faces 15 and 16 and is composed of parts which rotate with the clutch and are disposed closely adjacent the faces 15 and 16. While this bridge structure may provide two or more axially extending flux paths, only one is employed in the present instance by two relatively thin walled magnetic sleeves 29 and 30 whose outer peripheries are only slightly smaller than the pole faces 15 and 16 and overlap the full axial length of these faces and span the gap between these faces. These sleeves are mounted on flanges 32 of the respective clutch disks 17 and 22 so that their adjacent ends are urged by the spring arms 27 continuously into rubbing contact. As a result, the gaps 31 between the stationary pole faces 15 and 16 and the outer peripheries of the sleeves 29 and 30 are the only interruptions in the magnetic circuit which encircles the coil 14 and is indicated by the dotted line in Fig. 1.

The gaps 31 are made as narrow as possible, usually about .010 of an inch, but are of substantial area and therefore permit a substantial concentration of flux in the relatively narrow path which extends axially through the sleeves 29 and 30. An attractive force of substantial magnitude is thus derived and directed axially so that it may be utilized to cause gripping engagement of the clutch elements. For this purpose, the sleeves are pressed onto outturned cylindrical flanges 32 integral with the disks 17 and 22 and their outer ends are crimped around the flange ends so that the sleeves and disks are united into a rigid structure, the sleeves thus being mounted for rotation with the respective clutch elements and accurately held in close proximity to the stationary magnet faces 15 and 16.

As long as the magnet coil remains deenergized, the clutch elements will slip relative to each other, the pulley, the disk 17, and the sleeve 30 being held against turning by the load on the pulley. However, the clutch surfaces and the ends of the magnetic sleeves are maintained in contact so that the reluctance of the magnetic bridge structure remains constant at all times. When the coil is energized, the flux threading the low reluctance path indicated draws the sleeves 29 and 30 and therefore the clutch elements rigid therewith into firm gripping engagement. Thus engaged, the clutch transmits the shaft motion to the pulley.

I claim as my invention:

1. A magnetic clutch comprising an annular magnet coil, a stationarily mounted magnetic core enclosing said coil and having pole projections terminating in inwardly facing axially spaced cylindrical surfaces, cylindrical magnetic rings coaxially arranged with their outer surfaces concentric with and disposed in close proximity to said core surfaces, means supporting said rings for rotation relative to each other and for rotation in unison about their axis, and means yieldably urging said rings toward each other and maintaining light mechanical contact between them, said rings being narrower in radial thickness than the axial lengths of said first mentioned surfaces.

2. A magnetic clutch comprising an annular magnet coil, a stationarily mounted magnetic core enclosing said coil and having pole projections terminating in inwardly facing axially spaced cylindrical surfaces, cylindrical magnetic rings coaxially arranged with their outer surfaces concentric with and disposed in close proximity to said core surfaces, means supporting said rings for rotation relative to each other and for rotation in unison about their axis, inturned flanges rigid with and mounted on said rings and having axially facing friction surfaces engaging each other when the ends of said rings are in engagement with each other, and means yieldably urging said rings toward each other and maintaining light mechanical contact between them.

3. A magnetic clutch comprising an annular magnet coil, a stationary magnetic ring enclosing said coil and having inwardly facing cylindrical pole faces concentric with the axis of said ring and axially spaced from each other, magnetic sleeves concentric with and slightly smaller in diameter than said pole faces and mounted within the latter in end to end engagement and for independent rotation about said axis, disks rigid with the adjacent ends of the respective sleeves and having axially engageable friction faces, and means yieldably urging said sleeves and disks axially to maintain continuous mechanical contact of said friction faces and also of the ends of said sleeves, said disks frictionally gripping each other when said coil is energized to cause a flux flow through said ring and said sleeves.

4. A magnetic clutch comprising an annular magnet coil, a stationary magnet ring enclosing said coil and providing radially facing axially spaced pole faces, magnetic sleeves arranged in end to end abutting relation with their surfaces disposed opposite and in close proximity to said pole faces, rotatable clutch elements mounted for relative rotation about the axis of said ring and axially engageable with each other, and means connecting said sleeves and the respective clutch elements to cause gripping engagement of the latter when said coil is energized.

5. A magnetic clutch comprising an annular magnet coil, a stationary magnet ring enclosing said coil and providing radially facing axially spaced pole faces, magnetic sleeves arranged in end to end abutting relation with their surfaces disposed opposite and in close proximity to said pole faces, said sleeves being mounted for rotation independently and in unison about the axis of the magnet ring, and a friction clutch having an axially facing surface brought into gripping engagement upon energization of the magnetic flux circuit through said magnet ring and said sleeves.

6. A magnetic clutch comprising an annular magnet coil, a stationarily mounted magnetic core enclosing said coil and having axially spaced inwardly facing cylindrical surfaces, axially engageable rotary friction clutch elements mounted for rotation relative to each other about a common axis, means acting constantly to urge said elements axially toward each other to maintain their friction faces in continuous mechanical contact, and means providing a magnetic flux circuit of constant reluctance between said cylindrical surfaces and adapted, when energized by excitation of said coil, to cause gripping engagement of said clutch elements, said last mentioned means including two rotatable rings of magnetic material arranged in fixed end to end relation and having outer peripheral surfaces concentric with and disposed in close proximity to said first mentioned cylindrical surfaces.

JOHN GEORGE OETZEL.

REFERENCES CITED

The following references are of record in the file of this patent:

UNITED STATES PATENTS

| Number | Name | Date |
| --- | --- | --- |
| 1,622,939 | Bing | Mar. 29, 1927 |
| 1,745,413 | Forster | Feb. 4, 1930 |
| 1,746,365 | Schunemann | Feb. 11, 1930 |
| 2,421,757 | Oetzel | June 10, 1947 |

FOREIGN PATENTS

| Number | Country | Date |
| --- | --- | --- |
| 119,972 | Germany | Apr. 30, 1901 |
| 364,330 | Great Britain | Jan. 7, 1932 |